Oct. 29, 1935.  L. W. BLAU ET AL  2,018,756
COMPOUND SEISMOGRAPH
Filed Aug. 18, 1932  2 Sheets-Sheet 2
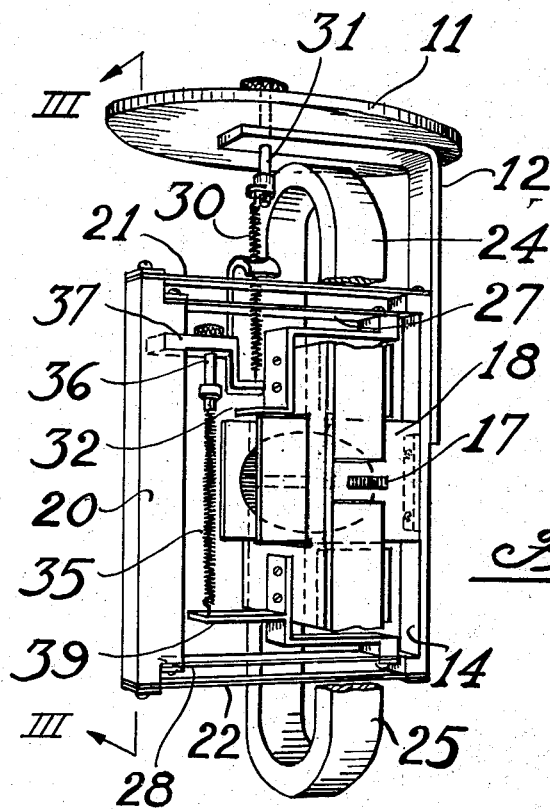
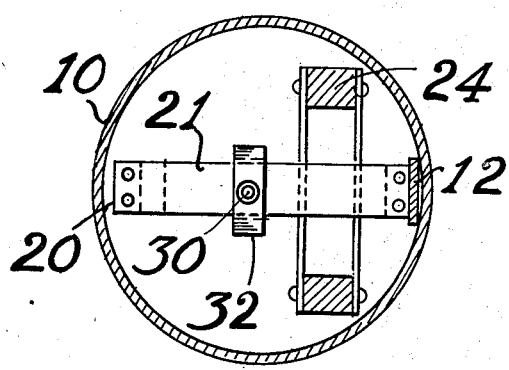
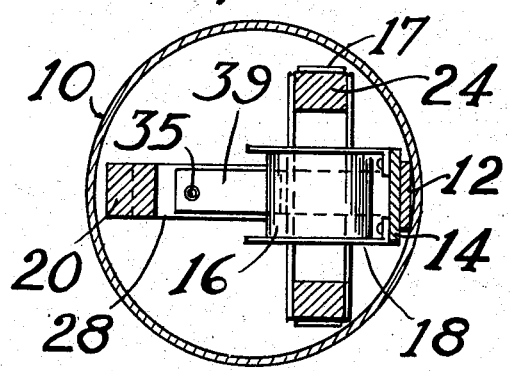
Ludwig W. Blau
Morris M. Slotnick   INVENTORS
Louis Statham
BY
W. E. Currie  ATTORNEY.

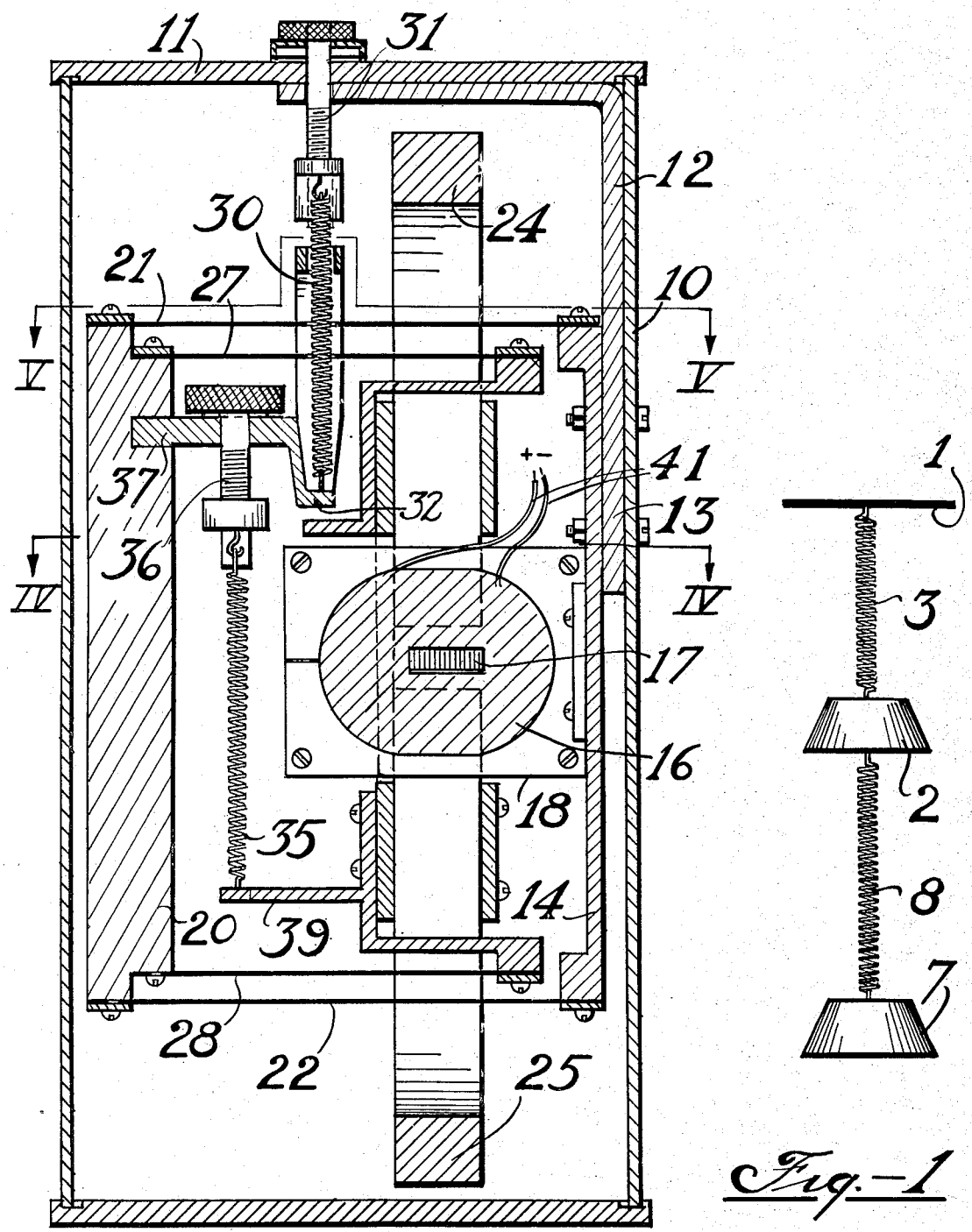

Patented Oct. 29, 1935

2,018,756

UNITED STATES PATENT OFFICE 2,018,756

COMPOUND SEISMOGRAPH

Ludwig W. Blau, Morris M. Slotnick, and Louis Statham, Houston, Tex., assignors to Standard Oil Development Company, a corporation of Delaware Application August 18, 1932, Serial No. 629,262

10 Claims. (Cl. 177—352)

This invention relates to improvements in method and apparatus for the observation of seismic disturbances.

The invention will be fully understood from the following description taken in connection with the accompanying drawings in which latter—

Fig. 1 is a side elevational view of an elementary form of compound seismograph;

Fig. 2 is a perspective view of a preferred embodiment of the invention;

Fig. 3 is a longitudinal sectional view taken along the line III—III of Fig. 2;

Fig. 4 is a transverse sectional view taken along the line IV—IV of Fig. 3; and

Fig. 5 is a transverse sectional view taken along the line V—V of Fig. 3.

Referring particularly to Fig. 1, an elementary form of the compound seismograph is shown comprising a frame 1 suitably disposed to be shaken by seismic disturbances. A mass 2 is suspended from the frame 1 by means of a helical spring 3. In the structure thus far described a seismic wave which may be due to an earthquake, an explosion or any other disturbance of the ground shakes the frame 1. The mass 2 therefore acquires a motion relative to the frame. The mass 2 does not acquire the full amplitude of this motion of the ground due to its inertia. The mass acquires a small amplitude of motion which is out of phase with the motion of the ground and which amplitude depends upon the frequency and amplitude of the forcing vibration. The phase angle of this motion is negative; that is, the seismograph reaches its maximum amplitude before the maximum amplitude is attained by the ground. The tangent of the phase angle is directly proportional to the product of the damping factor and the frequency of the forcing vibration and varies indirectly with the difference in the squares of the natural undamped frequency of the seismograph and the frequency of the forcing vibration. It is evident then that it is impossible to make the phase angle zero without making the damping vanish. The latter, however, is impracticable because with zero damping resonance effects would be introduced which would be much more undesirable than the distortion of the record due to the phase angle.

An auxiliary mass 7 is suspended from the mass 2 by means of a helical spring 8. Whatever motion may now be acquired by the mass 7 is due directly to the motion of the mass 2 and only indirectly to the motion of the frame 1. It is obvious that the amplitude of mass 7 is about the same fraction of the amplitude of mass 2 as the amplitude of the mass 2 is of the amplitude of the frame. In other words if the amplitude of mass 2 is $$\frac{1}{n}$$

of the amplitude of the frame 1, then the amplitude of the mass 7 is only about $$\frac{1}{n^2}$$

of the amplitude of the frame 1. Consequently the amplitude of the mass 7 is very materially reduced so that the relative motion between the frame 1 and the mass 7 is very nearly the same as the motion of the ground itself and differs from it as a matter of fact only to an imperceptible degree, if at all. Furthermore the tangent of the phase angle characteristic of the motion of the mass 7 is in the compound seismograph directly proportional to the difference between two numbers depending on the constants, hence the physical dimensions of the seismograph, and indirectly to the fourth power of the forcing frequency minus the product of a constant and the square of the frequency plus another constant, both constants depending herealso on the physical dimensions of the seismograph. The phase angle will therefore be zero if the constants determining it are properly selected. The motion of the frame 1 relative to the mass 7 is recorded by any suitable means not shown.

Referring particularly to Figs. 2, 3, 4 and 5 of the drawings, a preferred embodiment of the invention is shown. Reference numeral 10 designates a case for the instrument having a closure 11 to which a frame 12 is rigidly secured. The frame 12 comprises bars 13 and 14 rigidly secured together. A coil 16 comprising a winding of copper or other metal wire upon a laminated iron core 17 is rigidly secured to the frame 12 by means of a coil frame 18.

A compound movable system is resiliently supported from the frame as follows: A mass 20 is supported by the free ends of flat leaf springs 21 and 22 which are in turn secured in a substantially horizontal position at their opposite ends to the frame 12.

The mass 20 in turn yieldably suspends a unit including magnets 24 and 25 which are rigidly fastened together by means of a plate or support 26. Springs 27 and 28 are secured at one end to the mass 20 in a substantially horizontal position and are secured at their opposite ends to the movable system comprising the magnets 24 and 25.

The magnet unit comprising magnets 24 and 25 is partially supported for vertical oscillation by means of a helical spring 35 which is adjustably connected at its upper end to a screw 36 which is adjustable and rigidly carried by the mass 20. The lower end of the spring 35 is secured to a bracket 39 rigidly attached to the magnet system. The mass 20 is suspended by means of a helical spring 30 the upper end of which is secured for vertical adjustment by means of a screw 31, which can be adjusted through the wall of the closure 11. Any motion of the ground is transmitted through the case 10 and the coil 16 and core 17. The mass 20 partakes of this motion to a slight extent. The magnets 24 and 25 which constitute the mass of the second system derive their motion from the mass 20. Consequently the magnets acquire an insignificantly small amplitude of motion, if any. The coil, however, is rigidly attached to the ground and the relative motion between the coil and the magnets 24 and 25 is therefore essentially the ground motion. Consequently the current induced in the coil is accurately, and to a decidedly higher degree than it has heretofore been possible to achieve, proportional to the velocity of the ground motion. Any disturbance of the ground shakes the frame and therefore the coil. Due to the motion of the coil between the poles of the magnets an electromotive force is generated by the cutting of the magnetic lines of force. The induced current is conducted from the coil through leads 41 to suitable means not shown for amplifying the current and to recording means also not shown.

By the construction described a system is provided which remains at rest when the ground carrying the case from which the system is suspended is in motion.

It will be understood that the principle of construction above described can be incorporated in any vertical or horizontal mechanical seismograph and into any other electrical seismograph operating on any physical principle whatever. Such a mechanical seismograph may for instance include a mirror connected between the mass and the frame in such a way that the relative motion causes the mirror to be rotated and the image of the filament of a lamp focused on a rotating drum to be reflected. In condenser seismographs the mass may form one plate of the condenser while the other plate is connected to the frame. The motion of the ground changes the capacity of the condenser consisting of the two plates and the dielectric between the two plates. This change in the capacity is used to cause a change in the plate current of a vacuum tube. The plate circuit of the vacuum tube is then connected to a galvanometer mirror. Other seismographs which need not be further described are based on the piezo-electric effects, or, in the case of a carbon button seismograph on the change of resistance of carbon with pressure. The hot-wire seismograph is based on the change in resistance with temperature of a platinum wire.

While the invention has been described as employing a second mass suspended resiliently from a first mass, in turn resiliently suspended from a frame, it will be understood that a third mass can be resiliently suspended from the second mass, etc., and the advantages of the invention will be retained.

Various changes may be made within the scope of the appended claims in which it is desired to claim all novelty inherent in the invention as broadly as the prior art permits.

We claim:

1. In a seismograph, a frame, a mass, means for resiliently suspending the mass from the frame whereby seismic waves effect oscillation of the mass, an auxiliary mass, means for resiliently suspending the auxiliary mass from the first mentioned mass, and means for recording the relative movement between the auxiliary mass and the frame.

2. In a seismograph, a frame, a mass, a helical spring for resiliently suspending the mass from the frame whereby seismic waves effect oscillation of the mass, an auxiliary mass, a helical spring for resiliently suspending the auxiliary mass from the first mentioned mass, and means for recording the relative movement between the auxiliary mass and the frame.

3. In a seismograph, a frame, a coil rigidly secured to the frame and including a core the ends of which protrude from the coil, a mass, means for resiliently suspending the mass from the frame whereby seismic waves effect oscillation of the mass, magnets constituting an auxiliary mass, means for resiliently suspending the magnets from the first mentioned mass with the poles of the magnets disposed on opposite sides of and spaced from the ends of the core whereby oscillation of the magnets relative to the core induces electro-motive force across the coil wound on the core, and means for recording the electro-motive force.

4. In a seismograph, a frame, a coil rigidly secured to the frame and including a core the ends of which protrude from the coil, a mass, a substantially horizontally disposed flat spring for resiliently suspending the mass from the frame whereby seismic waves effect oscillation of the mass, magnets constituting an auxiliary mass, spring means for resiliently suspending the magnets from the first mentioned mass with the poles of the magnets disposed on opposite sides of and spaced from the ends of the core whereby oscillation of the magnets relative to the core induces electro-motive force across the coils wound on the core, and means for recording the electro-motive force.

5. In a seismograph, a frame, a mass, means resiliently suspending the mass from the frame, a second mass, means resiliently suspending the second mass from the first mentioned mass, and indicating means associated with the second mass and the frame to indicate differences in motion between the second mass and the frame.

6. In a seismograph, a frame, a mass, means resiliently suspending the mass from the frame, a plurality of masses in series, each successive mass being resiliently suspended from the preceding mass, and indicating means between the last mass and the frame to indicate differences in motion between the last mass and the frame.

7. In a seismograph, a frame, a mass, means resiliently supporting the mass from the frame, a second mass, means resiliently supporting the second mass from the first mentioned mass, and indicating means between the second mass and the frame to indicate differences in motion between the second mass and the frame.

8. In a seismograph, a frame, a mass, means resiliently supporting the mass from the frame, a plurality of masses in series, each successive mass being resiliently supported from the preceding mass and the frame, and indicating means between the last mass and the frame to indicate differences in motion between the last mass and the frame.

9. In a seismograph, a frame, a mass, means resiliently suspending the mass from the frame, a unit including a support, complementary permanent magnets fixed to the support and defining arms having confronting pole faces, each of such magnets having poles of opposite polarity, means resiliently suspending the unit from the mass, and a second unit including a coil between the arms of the magnets and fixed to the frame and wound on a core extending through the coil and disposed between the pole faces of the magnets.

10. In a recording system, a frame, a mass, helical spring means resiliently suspending the mass from the frame, a unit including a support, complementary permanent magnets fixed to the support and defining arms having confronting pole faces, each of such magnets having poles of opposite polarity, helical spring means resiliently suspending the unit from the mass, and a second unit including a coil between the arms of the magnets fixed to the frame and wound on a core extending through the coil and disposed between the pole faces of the magnets.

LUDWIG W. BLAU.
MORRIS M. SLOTNICK.
LOUIS STATHAM.